(12) United States Patent
Hilfiger et al.

(10) Patent No.: US 11,434,408 B2
(45) Date of Patent: Sep. 6, 2022

(54) TERPENE-BASED SPOTTING FLUID COMPOSITIONS FOR DIFFERENTIAL STICKING

(71) Applicant: Saudi Arabian Oil Company, Dhahran (SA)

(72) Inventors: Matthew Gary Hilfiger, Houston, TX (US); Carl Joseph Thaemlitz, Houston, TX (US)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 17/375,845

(22) Filed: Jul. 14, 2021

(65) Prior Publication Data

US 2021/0340425 A1 Nov. 4, 2021

Related U.S. Application Data

(62) Division of application No. 15/424,433, filed on Feb. 3, 2017, now abandoned.

(Continued)

(51) Int. Cl.
*E21B 31/00* (2006.01)
*E21B 37/00* (2006.01)
(Continued)

(52) U.S. Cl.
CPC ............. *C09K 8/36* (2013.01); *E21B 31/00* (2013.01); *E21B 36/008* (2013.01); *E21B 37/00* (2013.01);
(Continued)

(58) Field of Classification Search
None
See application file for complete search history.

(56) References Cited

U.S. PATENT DOCUMENTS 3,328,295 A 6/1967 Lummus
5,002,672 A 3/1991 Hayes
(Continued)

FOREIGN PATENT DOCUMENTS

EP 0461584 A2 12/1991
EP 0699729 A1 3/1996
(Continued)

OTHER PUBLICATIONS

Chiappisi, Leonardo; "Polyoxyethylene alkyl ether carboxylic acids: An overview of a neglected class of surfactants with multiresponsive properties" Advances in Coloid and Interface Science 250 (2017); pp. 79-94.

(Continued)

*Primary Examiner* — Charles R Nold
(74) *Attorney, Agent, or Firm* — Bracewell LLP; Constance G. Rhebergen; Brian H. Tompkins

(57) ABSTRACT

Terpene-based spotting fluid compositions and processes for freeing differentially stuck pipe are provided. A spotting fluid composition includes a terpene and an acid, such that the acid initiates an exothermic polymerization reaction of the terpene. Another spotting fluid composition includes an invert emulsion having a terpene external phase and a non-miscible organic hygroscopic fluid internal phase. The terpene emulsion spotting fluid composition may be introduced downhole in the vicinity of a portion of a differentially stuck pipe such that the spotting fluid composition contacts a filter cake surrounding the portion of the differentially stuck pipe. An acid may be introduced downhole in the vicinity of a portion of a differentially stuck pipe such that the acid initiates an exothermic polymerization reaction of the terpene of the terpene emulsion spotting fluid composition.

15 Claims, 1 Drawing Sheet

Related U.S. Application Data

(60) Provisional application No. 62/291,768, filed on Feb. 5, 2016.

(51) Int. Cl.
*E21B 36/00* (2006.01)
*C09K 8/36* (2006.01)

(52) U.S. Cl.
CPC ...... *C09K 2208/02* (2013.01); *C09K 2208/34* (2013.01)

(56) References Cited

U.S. PATENT DOCUMENTS

| | | | |
|---|---|---|---|
| 5,127,475 A | | 7/1992 | Hayes |
| 5,254,531 A | | 10/1993 | Mueller et al. |
| 5,321,224 A | | 6/1994 | Kamimura et al. |
| 5,344,817 A | | 9/1994 | Hayes |
| 5,415,230 A | | 5/1995 | Fisk, Jr. |
| 5,555,937 A | | 9/1996 | Fisk, Jr. |
| 5,652,200 A | * | 7/1997 | Davies ............ C09K 8/04 507/135 |
| 5,700,767 A | | 12/1997 | Adams |
| 6,176,243 B1 | | 1/2001 | Blunk |
| 6,267,186 B1 | | 7/2001 | Hayatdavoudi |
| 6,435,276 B1 | | 8/2002 | Kercheville et al. |
| 8,048,828 B2 | | 11/2011 | Deville |
| 8,048,829 B2 | | 11/2011 | Deville |
| 8,691,731 B2 | | 4/2014 | Jennings |
| 9,222,013 B1 | * | 12/2015 | Champagne ............ C09K 8/66 |
| 2006/0160706 A1 | * | 7/2006 | Deville ................ C09K 8/32 507/261 |
| 2015/0152316 A1 | | 6/2015 | Svoboda |
| 2016/0053160 A1 | | 2/2016 | Nguyen |
| 2016/0075934 A1 | | 3/2016 | Champagne |
| 2016/0160610 A1 | | 6/2016 | Belakshe |

FOREIGN PATENT DOCUMENTS

| | | |
|---|---|---|
| EP | 1756394 B1 | 10/2011 |
| WO | 9520094 A1 | 7/1995 |
| WO | 2006087505 A2 | 8/2006 |

OTHER PUBLICATIONS

Duarte, Fernanda et al.; "The Alkaline Hydrolysis of Sulfonate Esters: Challenges in Interpreting Experimental and Theorectical Data" Journal of Organic Chemistry, 2014, 79; pp. 2816-2828.

International Search Report and Written Opinion for International Application No. PCT/US2017/016433; International Filing Date Feb. 3, 2017; dated May 11, 2017; 11 pages.

* cited by examiner

TERPENE-BASED SPOTTING FLUID COMPOSITIONS FOR DIFFERENTIAL STICKING

CROSS-REFERENCE TO RELATED APPLICATIONS

This application claims priority from U.S. application Ser. No. 15/424,433 filed Feb. 3, 2017, and titled "TERPENE-BASED SPOTTING FLUID COMPOSITIONS FOR DIFFERENTIAL STICKING," which claims priority from U.S. Provisional Application No. 62/291,768 filed Feb. 5, 2016, and titled "TERPENE-BASED SPOTTING FLUID COMPOSITIONS FOR DIFFERENTIAL STICKING," each of which are incorporated in their entirety for purposes of United States patent practice.

BACKGROUND

Field of the Disclosure

Embodiments of the disclosure generally relate to downhole treatment fluids and, more specifically, spotting fluids used to free differentially stuck pipe in a well.

Description of the Related Art

Drilling and production systems are employed to access and extract hydrocarbons from hydrocarbon reservoirs in geologic formations. During the course of drilling a well, pipe inserted into the well may become stuck such that the pipe is unable to be rotated or reciprocated. Differentially stuck pipe, such as a drill string or casing, occurs when a pressure differential across a permeable zone of the formation causes a vacuum seal which locks the drill string or casing in place. In some instances, lubrication fluids, dehydrating agents such as anhydrous glycols, and acids, either alone or in combination, may be used in an attempt to free the differentially stuck pipe. For example, dehydrating agents may be used to dehydrate the filter cake to assist in relive pressure and break the vacuum seal against the permeable zone of the formation.

SUMMARY

Spotting fluids may be used to free differentially stuck pipe (for example, drill string or casing) in a well. Pipe inserted in a wellbore may become sealed against a geologic formation due to the buildup of material (for example, a filter cake) around a portion of the pipe. A spotting fluid is introduced to remove or reduce this seal and free the stuck pipe. However, preparation and use of existing spotting fluids may be time-consuming and require hours of soak time to be effective. Some spotting fluids may use corrosive fluids to reduce or remove the seal of the filter.

Embodiments of the disclosure generally relate to terpene-based spotting fluid compositions for freeing differentially stuck pipe in a well. More specifically, embodiments of the disclosure include a spotting fluid composition that includes a terpene and an acid (such as a sulfonic acid or a Lewis acid) and a spotting fluid composition that includes an invert emulsion having a terpene external phase and a non-miscible organic hygroscopic fluid internal phase.

In one embodiment, a spotting fluid composition for freeing differentially stuck pipe is disclosed that includes an invert emulsion. The invert emulsion has an external phase that includes a terpene and an internal phase that includes a hygroscopic fluid. In some embodiments, the terpene includes at least one of d-limonene, α-pinene, β-pinene, myrecene, geraniol, carvone, crysanthemic acid, farnesol, humulene, squalene, careen, camphene, α-terpinene, γ-terpinene, and sabinene. In some embodiments, the terpene is selected from the group consisting of d-limonene, α-pinene, β-pinene, myrecene, geraniol, carvone, crysanthemic acid, farnesol, humulene, squalene, careen, camphene, α-terpinene, γ-terpinene, and sabinene. In some embodiments, the hygroscopic fluid includes anhydrous glycol. In some embodiments, the terpene consists of d-limonene and the hygroscopic fluid consists of anhydrous glycol. In some embodiments, the invert emulsion consists of the external phase having the terpene and the internal phase having the hygroscopic fluid. In some embodiments, the external phase consists of the terpene and the internal phase consists of the hygroscopic fluid. In some embodiments, the terpene and hygroscopic fluid have a volumetric ratio in a range of 7:3 to 8:2. In some embodiments, the spotting fluid composition includes a viscosifier. In some embodiments, the spotting fluid composition includes an additive that acts as a wetting agent and an emulsifier.

In another embodiment, a method of freeing a differentially stuck pipe in a well is disclosed. The method includes introducing a spotting fluid composition in the vicinity of a portion of differentially stuck pipe, such that the spotting fluid contacts a material surrounding the portion of differentially stuck pipe. The spotting fluid composition includes an internal emulsion having an external phase that includes a terpene and an internal phase that includes a hygroscopic fluid. In some embodiments, the terpene may include at least one of d-limonene, α-pinene, β-pinene, myrecene, geraniol, carvone, crysanthemic acid, farnesol, humulene, squalene, careen, camphene, α-terpinene, γ-terpinene, and sabinene. In some embodiments, the terpene is selected from the group consisting of d-limonene, α-pinene, β-pinene, myrecene, geraniol, carvone, crysanthemic acid, farnesol, humulene, squalene, careen, camphene, α-terpinene, γ-terpinene, and sabinene. The method further includes allowing the spotting fluid composition to interact with the material surrounding the portion of differentially stuck pipe over a time period. The method also includes introducing a sulfonic acid in the vicinity of a portion of differentially stuck pipe such that the sulfonic acid contacts the spotting fluid composition and initiates a polymerization reaction of the terpene. In some embodiments, the polymerization reaction generates a temperature differential of up to 300° F. In some embodiments, the sulfonic acid includes dodecylbenzenesulfonic acid (DDBSA). In some embodiments, the method includes introducing a Lewis acid in the vicinity of a portion of differentially stuck pipe such that the Lewis acid contacts the spotting fluid composition and initiates a polymerization reaction of the terpene. In some embodiments, the hygroscopic fluid includes anhydrous glycol. In some embodiments, the external phase consists of a terpene and the internal phase consists of a hygroscopic fluid. In some embodiments, the invert emulsion consists of the external phase that includes the terpene and the internal phase that includes the hygroscopic fluid. In some embodiments, the terpene consists of d-limonene and the hygroscopic fluid consists of anhydrous glycol. In some embodiments, the spotting fluid composition includes a viscosifier. In some embodiments the spotting fluid composition includes an additive that acts as a wetting agent and an emulsifier.

Additionally, in another, a method of forming a spotting fluid composition for freeing differentially stuck pipe is provided. The method includes providing an invert emulsion having an external phase that includes a terpene and an internal phase that includes a hygroscopic fluid. In some embodiments, the terpene may include at least one of: d-limonene, α-pinene, β-pinene, myrecene, geraniol, carvone, crysanthemic acid, farnesol, humulene, squalene, careen, camphene, α-terpinene, γ-terpinene, and sabinene. In some embodiments, the terpene is selected from the group consisting of d-limonene, α-pinene, β-pinene, myrecene, geraniol, carvone, crysanthemic acid, farnesol, humulene, squalene, careen, camphene, α-terpinene, γ-terpinene, and sabinene. In some embodiments, the hygroscopic fluid includes anhydrous glycol. In some embodiments, the terpene consists of d-limonene and the hygroscopic fluid consists of anhydrous glycol. In some embodiments, the invert emulsion includes the external phase that includes the terpene and the internal phase that includes the hygroscopic fluid. In some embodiments, the external phase consists of the terpene and the internal phase consists of the hygroscopic fluid. In some embodiments, the method includes adding a viscosifier to the invert emulsion. In some embodiments, the method includes adding an additive to the invert emulsion, the additive acting as a wetting agent and an emulsifier. In some embodiments, the method includes adding a lubricant to the invert emulsion.

BRIEF DESCRIPTION OF THE DRAWINGS

These and other features, aspects, and advantages of the present invention will become better understood with regard to the following descriptions, claims, and accompanying drawings. It is to be noted, however, that the drawings illustrate only several embodiments of the invention and are therefore not to be considered limiting of the invention's scope as it can admit to other equally effective embodiments.

DETAILED DESCRIPTION

Figure 1:
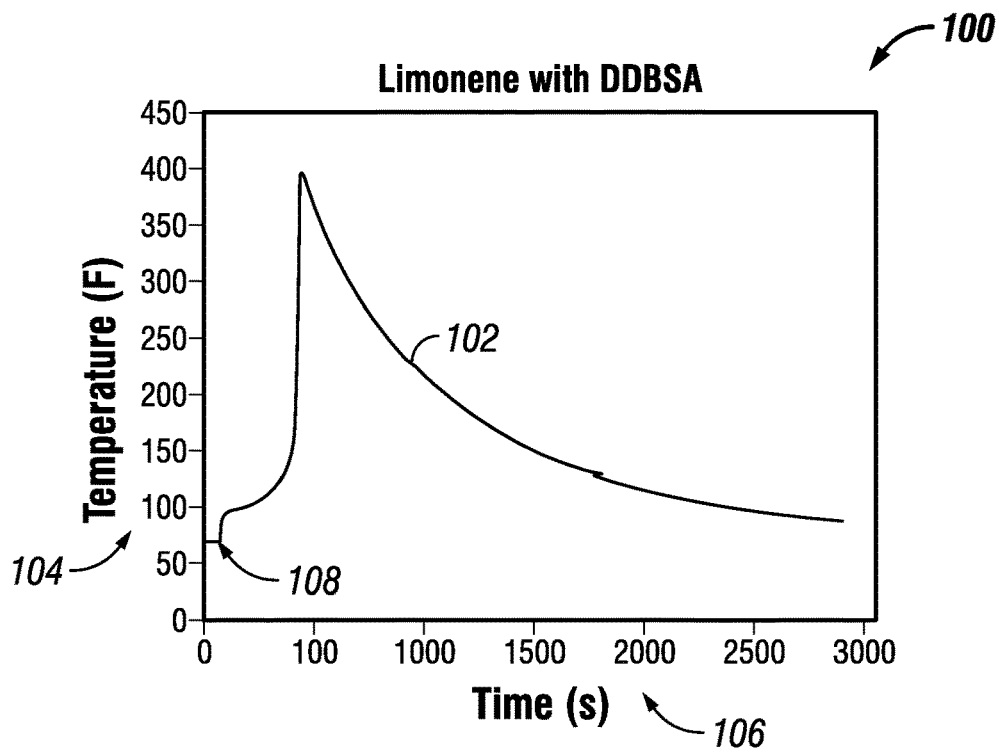
FIG. 1 is a plot showing the temperature increase of an exothermic reaction between a terpene (d-limonene) and dodecylbenzenesulfonic acid (DDBSA) in accordance with an embodiment of the disclosure.

The present disclosure will now be described more fully with reference to the accompanying drawings, which illustrate embodiments of the invention. This invention may, however, be embodied in many different forms and should not be construed as limited to the illustrated embodiments set forth in the disclosure. Rather, these embodiments are provided so that this disclosure will be thorough and complete, and will fully convey the scope of the invention to those skilled in the art.

The present disclosure includes compositions for use as spotting fluids and methods to free differentially stuck pipe in a well. The spotting fluid compositions and methods described in this disclosure may free differentially stuck pipe by removing or reducing the seal against a formation by material (for example, a filter cake) around the differentially stuck pipe. In some embodiments, the spotting fluid compositions and methods may remove or reduce the seal using an exothermic polymerization reaction to generate heat. Additionally, in some embodiments, the spotting fluid compositions and methods described in this disclosure may also lubricate the material around the differentially stuck pipe, dehydrate the material around the differentially stuck pipe, or both.

The present disclosure includes spotting fluid compositions having a terpene and an acid, and spotting fluid compositions having terpene invert emulsions. As used in this disclosure, the term "terpene" may include compounds described as "terpanoids." In alternate embodiments of the disclosure, terpenoids that are suitable for use in the spotting fluid compositions described in this disclosure may be used based on suitable solvency and reactivity properties.

In some embodiments, a terpene and acid spotting fluid composition may be used to free differentially stuck pipe by using the heat generated from the exothermic polymerization reaction of the terpene and the acid. In some embodiments, a terpene may be introduced downhole in the in the vicinity of a differentially stuck pipe. After the terpene is introduced downhole, an acid may be introduced downhole to initiate the exothermic polymerization reaction and generate heat to remove or reduce the seal of material around the differentially stuck pipe and free the pipe. In some embodiments, the terpene and acid may be mixed on the surface to form the spotting fluid composition before introduction downhole.

In some embodiments, a terpene emulsion spotting fluid composition may be formed from an invert emulsion having a terpene external phase and a non-miscible organic hygroscopic fluid. In some embodiments, the terpene emulsion fluid composition may be introduced downhole in the in the vicinity of a differentially stuck pipe. In some embodiments, the terpene emulsion spotting fluid composition may be allowed to soak for a time period, such as to lubricate the material around the differentially stuck pipe, dehydrate the material around the differentially stuck pipe, or both. After the terpene emulsion fluid composition is downhole, an acid may be subsequently introduced downhole to initiate an exothermic polymerization reaction of the terpene and generate heat to remove or reduce the seal of material around the differentially stuck pipe.

EXAMPLES

The following examples are included to demonstrate embodiments of the disclosure. It should be appreciated by those of skill in the art that the techniques and compositions disclosed in the example which follows represents techniques and compositions discovered by the inventors to function well in the practice of the invention, and thus can be considered to constitute modes for its practice. However, those of skill in the art should, in light of the present disclosure, appreciate that many changes can be made in the specific embodiments which are disclosed and still obtain a like or a similar result without departing from the spirit and scope of the invention.

The following non-limiting examples of spotting fluid compositions were tested and compared against a baseline mud. Table 1 shows the formulation of the baseline mud used in the differential sticking testing:

TABLE 1

Baseline Mud for Differential Sticking Testing

| Water | 0.95 oil barrels (bbl) |
|---|---|
| Bentonite | 25 pound/oil barrels (lb/bbl) |
| Caustic Soda | 1 lb/bbl |
| Lignosulfonate | 5 lb/bbl |

Table 2 shows the formulation of a first spotting fluid composition (Spotting Fluid A) used in the differential sticking testing. The first spotting fluid is formed from an invert emulsion having a terpene external phase and a non-miscible organic hygroscopic fluid internal phase. The first spotting fluid includes EZ-Mul® wetting agent/emulsifier (that is, an additive that acts as both a wetting agent and an emulsifier) manufactured by Halliburton of Houston, Tex., USA, and VG-69® organophilic clay viscosifier manufactured by M-I Swaco of Pleasanton, Tex., USA:

TABLE 2

| Spotting Fluid A for Differential Sticking Testing | |
|---|---|
| Limonene | 0.7 bbl |
| Glycerin | 0.3 bbl |
| EZ-Mul ® | 1 lb/bbl |
| VG-69 ® | 6 lb/bbl |

Table 3 shows the formulation of a second spotting fluid composition (Spotting Fluid B) used in the differential sticking testing. The second spotting fluid is formed from a terpene and a sulfonic acid:

TABLE 3

| Spotting Fluid B for Differential Sticking Testing | |
|---|---|
| Limonene | 0.9 bbl |
| DDBSA | 0.1 bbl |

Table 4 shows the formulation of a third spotting fluid composition (Spotting Fluid C) used in the differential sticking testing. The third spotting fluid is formed from an invert emulsion having a terpene external phase and a non-miscible organic hygroscopic fluid internal phase. The third spotting fluid includes Versawet® organic surfactant, Versacoat® organic surfactant, and Verasamul® multi-purpose emulsifier manufactured by manufactured by M-I Swaco of Pleasanton, Tex., USA and EstaDril 4000 manufactured by Croda International plc of Snaith, UK:

TABLE 4

| Spotting Fluid C for Differential Sticking Testing | |
|---|---|
| Limonene | 0.61 bbl |
| Versawet ® | 8.8 lb/bbl |
| Versacoat ® | 8.8 lb/bbl |
| Versamul ® | 4.3 lb/bbl |
| Estadril 4000 ® | 22.5 lb/bbl |
| Lime | 11.1 lb/bbl |
| Graphite powder | 13.8 lb/bbl |
| Glycerin | 0.21 bbl |
| Barite | 25.5 lb/bbl |

Table 5 shows the formulation of a fourth spotting fluid composition (Spotting Fluid D) used in the differential sticking testing. The fourth spotting fluid is formed from an invert emulsion having a terpene external phase and a non-miscible organic hygroscopic fluid internal phase. The fourth spotting fluid includes Versawet® organic surfactant, Versacoat® organic surfactant, and Verasamul® multi-purpose emulsifier manufactured by manufactured by M-I Swaco of Pleasanton, Tex., USA and EstaDril 4000 manufactured by Croda International plc of Snaith, UK:

TABLE 5

| Spotting Fluid D for Differential Sticking Testing | |
|---|---|
| Limonene | 0.60 bbl |
| Versawet ® | 8.6 lb/bbl |
| Versacoat ® | 8.6 lb/bbl |
| Versamul ® | 4.3 lb/bbl |
| Estadril 4000 ® | 21.6 lb/bbl |
| Lime | 10.8 lb/bbl |
| Graphite powder | 13.5 lb/bbl |
| Sodium chloride | 17.5 lb/bbl |
| Water | 0.21 bbl |
| Barite | 24.8 lb/bbl |

Table 6 shows the formulation of a fifth spotting fluid composition (Spotting Fluid E) used in the differential sticking testing. The fifth spotting fluid is formed from an emulsion having a terpene internal phase and water as the external phase. The fifth spotting fluid includes Tween 80® and Span 85® manufactured by Croda International plc of Snaith, UK. Spotting Fluid E was prepared by blending DDBSA in a mixer for 5 minutes before addition to the spotting fluid:

TABLE 6

| Spotting Fluid E for Differential Sticking Testing | |
|---|---|
| Water | 0.78 bbl |
| Tween 80 | 7.6 lb/bbl |
| Span 85 | 7.6 lb/bbl |
| Limonene | 0.13 bbl |
| Defoamer (silicone) | 1.2 lb/bbl |
| DDBSA | 15.2 lb/bbl |

The baseline mud, Spotting Fluid A, Spotting Fluid B, Spotting Fluid C, Spotting Fluid D, and Spotting Fluid E were tested using the following differential sticking test procedure using a differential sticking tester (also referred to as a "stickometer") having a filtration cell to enable deposition of a filter cake and a plate pressed under load onto the filter cake:

1. Prepare baseline mud;

2. Fill Fann stickometer to a scored line, apply 500 psi of pressure, and open the collector to obtain 10 ml of filtrate;

3. At 10 ml of filtrate, apply about 80 lb of force to the plate for 2 minutes to allow for sticking onto the filter cake;

4. Allow additional 2 ml of filtrate to be collected;

5. To obtain baseline mud data, allow filtering for about 16 hours, then obtain torque-to-free measurements by using a torque gauge three times and calculating the average torque;

6. To obtain spotting fluid data, depressurize the cell and dissemble to allow the plate to remain suck in the filter cake. Decant off the fluid and place the spotting fluid into the stickometer and repressurize to 500 psi;

7. Allow filtering for about 16 hours or until complete and then obtain torque-to-free measurements by using a torque gauge three times and calculating the average torque.

The results of the differential sticking test procedure for the baseline mud, Spotting Fluid A, Spotting Fluid B, Spotting Fluid C, Spotting Fluid D, and Spotting Fluid E are shown in Table 7:

TABLE 7

Differential Sticking Testing results

| Fluid | Torque to free (inches/pound (in/lb)) | % Improvement |
|---|---|---|
| Baseline Mud | 190 | |
| Spotting Fluid A (16 hours) | 143 | 25% |
| Spotting Fluid B (30 minutes) | 100 | 47% |
| Spotting Fluid B (9 hours) | 0 (9 hr fluid blowout, plate completely freed from filter cake) | 100% |
| Spotting Fluid C (16 hours) | 150 | 21% |
| Spotting Fluid D (16 hours) | 5 | 97% |
| Spotting Fluid E (16 hours) | 0 (16 hr fluid blowout, plate completely freed from filter cake) | 100% |

As shown in Table 4, an example terpene emulsion spotting fluid composition having a terpene external phase (Spotting Fluid A) shows a 25% reduction in torque-to-free the test plate from the test filter cake after a 16 hour time period. As also shown in Table 4, an example terpene and acid spotting fluid composition (Spotting Fluid B) shows a 47% reduction in torque-to-free the test plate from the filter cake after a 30 minute time period and completely frees the test plate from the filter cake after a 9 hour time period. In another example, another terpene emulsion spotting fluid composition having a terpene external phase (Spotting Fluid C) shows a 21% reduction in torque-to-free after a 16 hour time period. In yet another example, another terpene emulsion spotting fluid composition having a terpene external phase (Spotting Fluid D) shows a 97% reduction in torque-to-free after a 16 hour time period. Finally, an example terpene emulsion spotting fluid composition having a terpene internal phase (Spotting Fluid E) completely frees the test plate from the filter cake after a 16 hour time period.

TERPENE AND ACID SPOTTING FLUID COMPOSITIONS

In some embodiments, a terpene-based spotting fluid composition may include a terpene and a sulfonic acid. In some embodiments, the terpene may include d-limonene, α-pinene, β-pinene, myrecene, geraniol, carvone, crysanthemic acid, farnesol, humulene, squalene, careen, camphene, α-terpinene, γ-terpinene, and sabinene. In some embodiments, the sulfonic acid may include dodecylbenzenesulfonic acid (DDBSA), methanesulfonic acid (MsOH), benzene sulfonic acid, other suitable alkyl sulfonic acids, and other suitable alkaryl sulfonic acids. In some embodiments, the spotting fluid composition may be formed from d-limonene and DDBSA. In other embodiments, a heat generating spotting fluid composition may include a terpene and an inorganic acid such as sulfuric acid and nitric acid.

In some embodiments, a terpene and acid spotting fluid composition may be formed by introducing (for example, pumping) the terpene base fluid downhole, such as in a pill, following by introducing (for example, pumping) a relatively thin spacer fluid downhole, then by introducing (for example, pumping) an organic acid downhole. As used herein, the term "spacer fluid" refers to a fluid which can be viscosified and weighted. In some embodiments, the spacer fluid may include water viscosified with clays, natural gums (such as guar or xanthan), and polymers (such as partially hydrolyzed polyacrylamide (PHPA)). In some embodiments, the spacer fluid may include organic based spacer fluids, such as viscosified diesel/mineral oil with oil based viscosifiers such as aluminum stearates, styrenic polymers (styrene acrylates, carboxylated styrene butadienes, styrene butadienes and the like). In some embodiments, the spacer fluid may include weighting agents such as calcium carbonate, barite, hematite, and other suitable weighting agents.

Alternatively, in some embodiments, a terpene and acid spotting fluid composition may be formed on the surface before being introduced downhole, such as by mixing the terpene and the organic acid. The terpene and organic acid initiates an exothermic polymerization reaction of the terpene to generate heat to free the differentially stuck pipe.

In some embodiments, the exothermic reaction may reach up to 300° F. differential temperature generation. As used in the disclosure, the term "differential temperature" refers to a maximum temperature value minus a starting temperature value. FIG. 1 is a plot 100 showing the temperature increase (line 102) of an exothermic reaction between a terpene (d-limonene) and DDBSA in accordance with an embodiment of the disclosure. As shown in FIG. 1, the Y-axis 104 corresponds to the temperature of the d-limonene and DDBSA mixture and the X-axis 106 corresponds to the elapsed time. In one non-limiting example, 50 milliliters (ml) of d-limonene was placed in a beaker having a magnetic stir bar for agitation set to 400 revolutions-per-minute (rpm) on a stir plate. The temperature increase was measured by taking temperature measurements over a time period of 0 to 3000 seconds. As shown in FIG. 1, after 50 seconds for temperature stabilization, 4 ml of DDBSA was injected into the d-limonene at point 108.

As shown in FIG. 1, an initial exotherm occurred from 75° F. to 100° F. After 5 seconds of a relatively slow exothermic reaction, a relatively fast exotherm and associated temperature increase occurred from 100° F. to 400° F., after which the mixture began to cool after polymerization of the d-limonene. As shown in FIG. 1, the cooling occurred over time to less than 100° F.

In another embodiment, a terpene and acid spotting fluid composition may include a terpene base fluid and an initiator solution having a Lewis acid. In such embodiments, the terpene may include d-limonene, α-pinene, β-pinene, myrecene, geraniol, carvone, crysanthemic acid, farnesol, humulene, squalene, careen, camphene, α-terpinene, γ-terpinene, and sabinene. In some embodiments, the Lewis acid may include titanium tetrachloride ($TiCl_4$), boron trifluoride ($BF_3$), tin tetrachloride ($SnCl_4$), and aluminum chloride ($AlCl_3$). Here again, in some embodiments, a terpene and acid spotting fluid composition may be formed by introducing (for example, pumping) the terpene base fluid downhole, such as in a pill, following by introducing (for example, pumping) a relatively thin spacer fluid downhole, then by introducing (for example, pumping) the initiator solution having the Lewis acid downhole. In some embodiments, the spacer fluid may include water viscosified with clays, natural gums (such as guar or xanthan), and polymers (such as partially hydrolyzed polyacrylamide (PHPA)). In some embodiments, the spacer fluid may include organic based spacer fluids, such as viscosified diesel/mineral oil with oil based viscosifiers such as aluminum stearates, styrenic polymers (styrene acrylates, carboxylated styrene butadienes, styrene butadienes and the like). In some embodiments, the spacer fluid may include weighting agents such as calcium carbonate, barite, hematite, and other suitable weighting agents.

Alternatively, in some embodiments, the terpene and initiator solution having the Lewis acid may be formed on the surface before being introduced downhole. The terpene and Lewis acid of the initiator solution initiates an exothermic polymerization reaction of the terpene to generate heat to free the differentially stuck pipe.

TERPENE EMULSION SPOTTING FLUID COMPOSITIONS

In some embodiments, a spotting fluid composition may include an invert emulsion having a terpene as an external phase and a non-miscible organic hygroscopic fluid as a dehydrating internal phase. In some embodiments, the terpene external phase may include d-limonene, α-pinene, β-pinene, myrecene, geraniol, carvone, crysanthemic acid, farnesol, humulene, squalene, careen, camphene, α-terpinene, γ-terpinene, and sabinene. In some embodiments, the non-miscible organic hygroscopic fluid may include anhydrous glycol (also referred to as "glycerine" or "glycerin"). In some embodiments, the spotting fluid composition may be an invert emulsion having d-limonene as the external phase and anhydrous glycol as the internal phase. In some embodiments, the internal phase may include a saturated brine (for example, saturated calcium chloride) or a combination of a saturated brine and a non-miscible organic hygroscopic fluid such as anhydrous glycol. For example, in some embodiments a spotting fluid composition may include an invert emulsion having a terpene as an external phase and a sodium chloride brine as an internal phase.

In some embodiments, the spotting fluid composition of an invert emulsion having a terpene and a non-miscible organic hygroscopic fluid may be reacted with an organic acid or a Lewis acid downhole to generate heat to further assist in freeing differentially stuck pipe. In some embodiments, the heat generating spotting fluid composition of an invert emulsion having a terpene as an external phase and a non-miscible organic hygroscopic fluid as a dehydrating internal phase may be introduced (for example, pumped) downhole, followed by an organic acid or Lewis acid introduced (for example, pumped) downhole. As described supra, the heat generating spotting fluid composition and the organic acid or Lewis acid initiates an exothermic polymerization reaction of the terpene to release heat to free the differentially stuck pipe. In some embodiments, as shown in FIG. 1 and as discussed supra, the exothermic polymerization reaction of the terpene of the spotting fluid composition may reach up to 300° F. differential temperature generation.

In some embodiments, the invert emulsion of the spotting fluid composition may have terpene to non-miscible organic hygroscopic fluid volumetric ration of 7:3. In some embodiments, the invert emulsion of the spotting fluid composition may have a terpene to non-miscible organic hygroscopic fluid volumetric ration of 6:4. In some embodiments, the invert emulsion of the spotting fluid composition may have terpene to non-miscible organic hygroscopic fluid volumetric ratio of 8:2. In some embodiments, the invert emulsion of the spotting fluid composition may have terpene to non-miscible organic hygroscopic fluid volumetric ratio from about 7:3 to about 8:2.

In some embodiments, a spotting fluid composition may include an emulsion having a terpene as an internal phase and water as an external phase. In some embodiments, the terpene internal phase may include d-limonene, α-pinene, β-pinene, myrecene, geraniol, carvone, crysanthemic acid, farnesol, humulene, squalene, careen, camphene, α-terpinene, γ-terpinene, and sabinene. In some embodiments, the spotting fluid composition may be an emulsion having d-limonene as the internal phase and water as the external phase.

In some embodiments, a terpene emulsion spotting fluid composition may include a wetting agent/emulsifier and a viscosifier. In some embodiments, the wetting agent/emulsifier may include fatty acids, modified fatty acids, fatty amide condensates, imidazolines, ethoxylated sorbitan, and other suitable wetting agents/emulsifiers. In some embodiments, the viscosifier may include aluminum soaps, styrene butadiene latexes, styrene butadiene resins, carboxylated styrene butadienes, styrene acrylates, and other suitable viscosifiers. In some embodiments, a terpene emulsion spotting fluid composition may include a wetting agent/emulsifier additive and a clay additive. In some embodiments, a terpene emulsion spotting fluid composition may be formed from an invert emulsion having a terpene as an external phase and a non-miscible organic hygroscopic fluid as an internal phase, a wetting agent/emulsifier, and a clay. For example, in such embodiments, a spotting fluid composition may be formed from an invert emulsion having d-limonene as an external phase and anhydrous glycol as an internal phase, a wetting agent/emulsifier and a viscosifier.

In some embodiments, the terpene emulsion spotting fluid composition may include a lubricant. For example, in some embodiments, the lubricant may include glycerol esters, polyalphaolefins, phosphate esters, and other suitable lubricants. In some embodiments, the terpene emulsion spotting fluid composition may include lime (calcium hydroxide).

Figure 2:
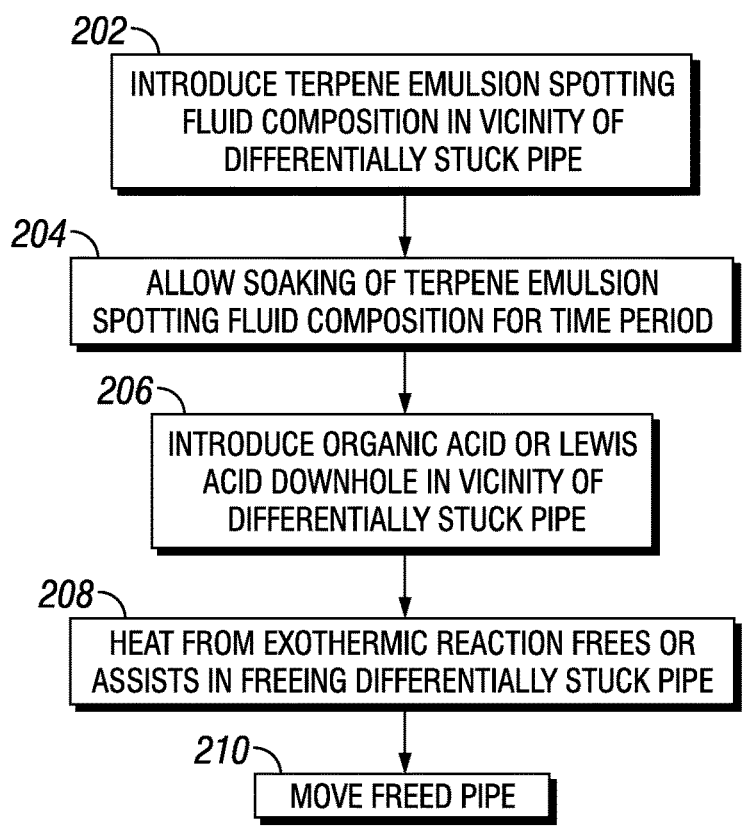
FIG. 2 is a block diagram of a process for freeing differentially stuck pipe using a terpene emulsion spotting fluid composition in accordance with an embodiment of the disclosure.

FIG. 2 depicts a process 200 for using a terpene emulsion spotting fluid composition in accordance with an embodiment of the disclosure. In some embodiments, a spotting fluid composition having an invert emulsion of a terpene and a non-miscible organic hygroscopic fluid may be introduced (for example, by pumped downhole) in the vicinity of a differentially stuck pipe (block 202). In some embodiments, the spotting fluid composition may be allowed to soak for a time period (block 204). For example, the spotting fluid composition may interact with the material (for example, filter cake) surrounding the stuck pipe.

In some embodiments, the spotting fluid composition may free the differentially stuck pipe after a soaking time period without the use of heat generated from an exothermic reaction. In such embodiments, the process 200 may not include the addition of an organic acid or a Lewis acid as further described.

After a soaking time period, an organic acid or a Lewis acid may be introduced (for example, pumped) downhole in the vicinity of a differentially stuck pipe (block 206). As described supra, the reaction between the terpene and the organic acid or Lewis acid produces heat to remove or reduce the seal of the material around the differentially stuck pipe (block 208). The freed pipe may then be moved, such as by removing the freed pipe from the wellbore (block 210).

In some embodiments, the spotting fluid compositions described in the disclosure may be used as fluid pills. In some embodiments, the spotting fluid compositions may include other monomers subject to exothermic polymerization reactions, such as acrylates, acrylamides, styrene, and other suitable monomers with initiators such as acid, caustic, and radical generation azo compounds and peroxides.

Ranges may be expressed in the disclosure as from about one particular value, to about another particular value, or both. When such a range is expressed, it is to be understood that another embodiment is from the one particular value, to the other particular value, or both, along with all combinations within said range.

Throughout this application, where patents or publications are referenced, the disclosures of these references in their entireties are intended to be incorporated by reference into this application, in order to more fully describe the state of the art to which the disclosure pertains, except when these references contradict the statements made in the disclosure.

Further modifications and alternative embodiments of various aspects of the disclosure will be apparent to those skilled in the art in view of this description. Accordingly, this description is to be construed as illustrative only and is for the purpose of teaching those skilled in the art the general manner of carrying out the embodiments described in the disclosure. It is to be understood that the forms shown and described in the disclosure are to be taken as examples of embodiments. Changes may be made in the elements described in the disclosure without departing from the spirit and scope of the disclosure as described in the following claims. Headings used in the disclosure are for organizational purposes only and are not meant to be used to limit the scope of the description.

What is claimed is:

1. A method of freeing differentially stuck pipe in a well, comprising:
   introducing a spotting fluid composition in the vicinity of a portion of differentially stuck pipe, such that the spotting fluid contacts a material surrounding the portion of differentially stuck pipe, the spotting fluid composition comprising:
      an invert emulsion including:
         an external phase comprising a terpene; and
         an internal phase comprising a hygroscopic fluid;
   introducing a Lewis acid in the vicinity of a portion of differentially stuck pipe such that the Lewis acid contacts the spotting fluid composition and initiates a polymerization reaction of the terpene.

2. The method of claim 1, wherein the terpene comprises at least one of: d-limonene, α-pinene, β-pinene, myrecene, geraniol, carvone, crysanthemic acid, farnesol, humulene, squalene, careen, camphene, α-terpinene, γ-terpinene, and sabinene.

3. The method of claim 1, comprising allowing the spotting fluid composition to interact with the material surrounding the portion of differentially stuck pipe over a time period.

4. The method of claim 1, wherein the hygroscopic fluid comprises anhydrous glycol.

5. The method of claim 1, wherein the invert emulsion consists of:
   the external phase comprising the terpene; and
   the internal phase comprising the hygroscopic fluid.

6. The method of claim 1, wherein the terpene consists of d-limonene and the hygroscopic fluid consists of anhydrous glycol.

7. The method of claim 1, wherein the spotting fluid composition comprises a viscosifier.

8. The method of claim 1, wherein the spotting fluid composition comprises an additive that acts as a wetting agent and an emulsifier.

9. The method of claim 1, wherein the spotting fluid composition comprises a lubricant.

10. The method of claim 1, comprising allowing the spotting fluid composition to interact with the material surrounding the portion of differentially stuck pipe over a time period.

11. The method of claim 1, wherein the terpene comprises at least one of: d-limonene, α-pinene, β-pinene, myrecene, geraniol, carvone, crysanthemic acid, farnesol, humulene, squalene, careen, camphene, α-terpinene, γ-terpinene, and sabinene.

12. The method of claim 1, wherein the polymerization reaction generates a temperature differential of up to 300° F.

13. The method of claim 1, wherein the sulfonic acid comprises dodecylbenzenesulfonic acid (DDBSA).

14. The method of claim 1, wherein the terpene comprises at least one of: d-limonene, α-pinene, β-pinene, myrecene, geraniol, carvone, crysanthemic acid, farnesol, humulene, squalene, careen, camphene, α-terpinene, γ-terpinene, and sabinene.

15. A method of freeing differentially stuck pipe in a well, comprising:
   introducing a spotting fluid composition in the vicinity of a portion of differentially stuck pipe, such that the spotting fluid contacts a material surrounding the portion of differentially stuck pipe, the spotting fluid composition comprising:
      an invert emulsion including:
         an external phase comprising a terpene; and
         an internal phase comprising a hygroscopic fluid;
   introducing a sulfonic acid in the vicinity of a portion of differentially stuck pipe such that the sulfonic acid contacts the spotting fluid composition and initiates a polymerization reaction of the terpene.

* * * * *